United States Patent
Tverlid

(10) Patent No.: US 9,004,163 B2
(45) Date of Patent: Apr. 14, 2015

(54) EQUIPMENT AND METHOD FOR REINFORCING A BOREHOLE OF A WELL WHILE DRILLING

(75) Inventor: Steinar Wasa Tverlid, Bjørøyhamn (NO)

(73) Assignee: Statoil Petroleum AS, Stavanger (NO)

( * ) Notice: Subject to any disclaimer, the term of this patent is extended or adjusted under 35 U.S.C. 154(b) by 664 days.

(21) Appl. No.: 13/262,773

(22) PCT Filed: Apr. 3, 2009

(86) PCT No.: PCT/EP2009/002484
§ 371 (c)(1),
(2), (4) Date: Jan. 20, 2012

(87) PCT Pub. No.: WO2010/112050
PCT Pub. Date: Oct. 7, 2010

(65) Prior Publication Data
US 2012/0111578 A1    May 10, 2012

(51) Int. Cl.
*E21B 33/138* (2006.01)
*C09K 8/512* (2006.01)

(52) U.S. Cl.
CPC .............. *E21B 33/138* (2013.01); *C09K 8/512* (2013.01)

(58) Field of Classification Search
CPC ........ E21B 33/138; E21B 33/14; C09K 8/512
USPC .............. 166/248, 285, 288, 295; 175/64, 72
See application file for complete search history.

(56) References Cited

U.S. PATENT DOCUMENTS

| 4,102,401 A | 7/1978 | Erbstoesser |
| 4,428,426 A | 1/1984 | Davies et al. |
| 4,784,223 A * | 11/1988 | Worrall et al. ................. 166/287 |
| 5,128,390 A | 7/1992 | Murphey et al. |
| 5,944,105 A | 8/1999 | Nguyen |
| 6,116,354 A | 9/2000 | Buytaert |

(Continued)

FOREIGN PATENT DOCUMENTS

| CA | 2528467 A1 | 5/2007 |
| EP | 0 542 397 A2 | 5/1993 |

(Continued)

OTHER PUBLICATIONS

Gaurina-Medimurec, Nediljka, et al., "Casing Drilling Technology," *Rudarsko-geološko-naftni zbornik*, vol. 17, pp. 19-26 (2005).

(Continued)

*Primary Examiner* — Cathleen Hutchins
(74) *Attorney, Agent, or Firm* — Patterson Thuente Pedersen, P.A.

(57) ABSTRACT

The equipment for drilling and reinforcing a borehole of a well comprises a drill pipe string carrying a drill tool at its lowermost end and a downhole treatment device held on the drill pipe string for applying a liner of polymer material at the surface of the borehole. The polymer material is a fusible and/or curable material dissolved and/or emulsified and/or dispersed in drilling fluid or mud circulated through the drill pipe string and an annulus between the drill pipe string and the wall of the borehole. The treatment device is adapted to concentrate energy for fusing and/or curing the polymer material contained in the drilling fluid in a limited space at the vicinity of the wall of the borehole. The treatment device thus focuses its energy in the vicinity of the wall and allows a continuous reinforcing of the borehole simultaneously while drilling.

19 Claims, 3 Drawing Sheets

(56) References Cited

U.S. PATENT DOCUMENTS

| | | |
|---|---|---|
| 6,311,773 B1 | 11/2001 | Todd et al. |
| 6,702,940 B2 | 3/2004 | Blange |
| 6,942,031 B1 | 9/2005 | Kalfoglou et al. |
| 7,013,992 B2 | 3/2006 | Tessari et al. |
| 7,216,711 B2 | 5/2007 | Nguyen et al. |
| 7,264,052 B2 | 9/2007 | Nguyen et al. |
| 7,334,637 B2 | 2/2008 | Smith, Jr. |
| 2002/0074166 A1 | 6/2002 | Chavez et al. |
| 2004/0195003 A1 | 10/2004 | Batarseh |
| 2006/0102343 A1 | 5/2006 | Skinner et al. |
| 2009/0314488 A1* | 12/2009 | Droger .................. 166/248 |

FOREIGN PATENT DOCUMENTS

| | | |
|---|---|---|
| EP | 0 879 935 A2 | 11/1998 |
| EP | 1 664 481 B1 | 6/2006 |
| NO | 151558 C | 5/1985 |
| NO | 156058 B | 4/1987 |
| NO | 179257 C | 9/1996 |
| NO | 300987 B1 | 8/1997 |
| NO | 307060 B1 | 1/2000 |
| NO | 310914 B1 | 9/2001 |
| NO | 315338 B1 | 8/2003 |
| NO | 316292 B1 | 1/2004 |
| NO | 321005 B1 | 2/2006 |
| RU | 2198284 C2 | 2/2003 |
| WO | WO 02/14453 A1 | 2/2002 |
| WO | WO 03/102086 A2 | 12/2003 |
| WO | WO 2005/121198 A1 | 12/2005 |
| WO | WO 2005/121500 A1 | 12/2005 |

OTHER PUBLICATIONS

Official Action dated Jul. 26, 2013 for EP Application No. 09 776 512.7-1610, 4 pages.

* cited by examiner

EQUIPMENT AND METHOD FOR REINFORCING A BOREHOLE OF A WELL WHILE DRILLING

PRIORITY CLAIM

The present application is a National Phase entry of PCT Application No. PCT/EP2009/002484, filed Apr. 3, 2009, the disclosure of which is hereby incorporated by reference herein in its entirety.

FIELD OF THE INVENTION

The invention relates to an equipment for drilling and reinforcing a borehole of a well, and further relates to a method for reinforcing a o borehole of a well while drilling the borehole.

BACKGROUND ART

Installing a casing in a borehole of an oil or natural gas well is an important part of the drilling and completion process. The casing serves to strengthen the surface of the borehole and ensures that no oil or natural gas s seeps out of the well as it is brought to the surface, and further ensures that other fluids or gases do not seep into the formation through the borehole. In particular, the casing prevents losses of drilling fluid circulating down the borehole through a drill pipe string and a drill bit carried on the downhole end of the drill pipe string and further circulating upward to the top of the o borehole through an annulus between the drill pipe string and the wall of the borehole. The drilling fluid cools the drill bit, removes cuttings from the borehole and maintains hydrostatic pressure on pressurized subterranean formations.

Usually, the surface or wall of the borehole is stabilized by running and cementing a tubular casing into the borehole, which means that drilling the borehole normally is a sequential process in which drilling the borehole and installing the casing alternate. The process is time-consuming, since the drill pipe string has to be removed from the borehole for installing the casing.

It is known to use the tubular casing instead of the drill pipe string to direct and rotate the drill bit. In such a casing while drilling system, the casing is part of the drilling assembly and may be cemented in place where the appropriate depth is reached, and thereafter a length of the tubular casing is run through the cemented casing portion for further drilling the borehole. The casing while drilling process is unpredictable to some extent, since the casing quite easily may stick to the borehole, which makes the position of the casing shoe unpredictable, and some length of the casing may be lost with the result that the well may not reach desired depth (Nediljka Gaurina-Medimurec, "Casing Drilling Technology", Rudarsko-geolosko-naftni zbornik, Zagreb 2005, Vol. 17, pages 19 to 26).

From U.S. Pat. No. 7,334,637 B2 it is known to form a temporary liner in a wellbore by extruding a fusible polymer liner material, such as polyethylene or polypropylene from an assembly supported on the drill pipe string. An extruder extrudes the liner material onto the wall of the borehole while the liner material is fed from a reservoir at the surface level of the borehole through an additional piping running through the drill string. A heat source, for example a laser device, melts the fusible liner material extruded onto the wall of the borehole to produce the liner.

The liner produced according to U.S. Pat. No. 7,334,637 B2 is a temporary liner intended to be replaced later on by a conventional tubular casing to be cemented in the borehole. The system requires an additional piping through the drill pipe. The fusible liner material must be capable of being extruded onto and adhered on the wall of the borehole.

Another method for stabilizing a wellbore during drilling in a sequential process is known from U.S. Pat. No. 5,944,105. A downhole portion of the drill pipe string is provided with a plurality of nozzles through which fluid jets can be ejected. After having drilled the borehole into an unstable subterranean formation, fluid is pumped through the nozzles to enlarge the borehole by fluid jet erosion while moving the drill pipe string upwardly. After having enlarged the diameter of the borehole, a hardenable, permeable material, for example a hardenable organic resin, is ejected through the nozzles to fill the enlarged portion of the borehole. The material is caused to harden by heat or a hardening agent, and thereafter the borehole is redrilled through the hardened material. The known method does not allow a continuous lining of the formation while drilling.

From WO 2005/121 198 A1 another sequential process for in-situ stabilizing the wall of a wellbore is known. After having drilled the borehole through a weak formation, the drill string is pulled up above the weak interval to be stabilized. A resin mixture is pumped through the drill string into the borehole to displace the drilling fluid from the drill string and the annulus between the drill string and the wall of the borehole and to squeeze the resin into the weak formation. After squeezing resin into the formation, the well is shut for several hours prior to cleaning set resin out of the wellbore and resuming drilling operation to deepen the well.

From U.S. Pat. No. 6,311,773 B1 it is known to consolidate particulate solids in subterranean zones around a wellbore by causing a hardenable resin composition to flow between the particulate solids of the subterranean zone. By hardening the resin composition, the particulate solids will be consolidated into a hard, permeable pack. Similar methods for consolidating the wall of a borehole are known, for example, from EP 0 879 935 A2, U.S. Pat. Nos. 7,216,711 B2, 7,264,052 B2, WO 03/102 086 A2, EP 0 542 397 A2 or U.S. Pat. No. 4,428,426. These documents disclose resin-coated particles, for example sand grains or other proppants, for treating subterranean formations, in particular subterranean fractures.

It is the main object of the invention to provide an equipment and a method, which allows reinforcing a borehole of a well, in particular a well of petroleum and/or natural gas, while at the same time drilling the borehole.

The equipment for drilling and reinforcing the borehole basically comprises equipment as it is known from U.S. Pat. No. 7,334,637 B2, in particular:
- a drill pipe string carrying a drill tool at its lowermost end;
- drilling fluid circulation means for circulating drilling fluid through the drill pipe string and an annulus between the drill pipe string and the borehole and
- a downhole treatment device held on the drill pipe string for applying a liner of polymer material at the surface of the borehole.

The improvement according to the invention is characterized in that the drilling fluid circulated through the annulus is a fluid system containing fusible and/or curable polymer material dissolved and/or emulsified and/or dispersed therein, and the treatment device is adapted to concentrate energy for fusing and/or curing the polymer material contained in the drilling fluid in a limited space at the vicinity of the surface of the borehole.

Since the polymer material for producing the liner of the borehole is contained in the drilling fluid (mud) anyway needed for drilling the borehole, no additional piping along the borehole or no downhole reservoir for polymer material is needed. It is an essential feature of the invention that the treatment device confines the energy necessary for forming the liner at the surface of the borehole to a limited space adjacent the wall so as not to fuse or cure polymer material within the bulk (rest) of drilling fluid circulating through the drill pipe string and the annulus.

The treatment device is positioned at the drill pipe string downhole in the vicinity of the drill tool, which may be in the form of a simple drill bit, but also may include a roamer or a downhole assembly including a downhole drill motor. Due to the downhole pressure of the drilling fluid, some of the drilling fluid including polymer material may be pressed into the pores of the formation and anchors the liner to the wall of the borehole. The polymer material may be dissolved or emulsified within the drilling fluid, but in particular is in a particulate form, for example in the form of powder-like particles or granules, which adhere to each other when being fused or cured by energy from the treatment device.

Polymer materials suitable for forming the liner of the borehole are known in the art; reference is made to the patent documents mentioned above. Further suitable polymer material is known from EP 1 664 481 B1, WO 2005/121 500 A1 or WO 02/14 453 A1.

The particulate polymer material may consist of polymer material only. Preferably, the particulate polymer material comprises solid particles coated with fusible and/or curable polymer material to mechanically strengthen the liner formed on the wall of the borehole. In a preferred embodiment, the solid particles are comprised of metal, in particular steel, to provide for ductility and toughness of the liner while the polymer material will bind the composite together.

Preferably, the particles of the particulate polymer material have a diameter of less than 1 mm, preferably of less than 0.3 mm, for example 0.1 mm, to improve anchoring in the formation and to reduce the porosity of the liner. A diameter of less than 0.3 mm is advantageous if the polymer material is coated onto particulate metal cores.

In a preferred embodiment, the treatment device comprises an energy radiating device which produces at least two distinct energy beams which are directed from different positions to a common spot in the limited space in the vicinity of the surface of the borehole where the energy beams intersect and focus the energy within said limited space. While the energy of a single energy beam does not suffice to fuse or cure the polymer material in the bulk of the drilling fluid, the focused energy of the plurality of the energy beams is sufficient for producing the liner.

In another embodiment, the energy source, e.g. an energy output port of the treatment device is positioned near the surface of the borehole and directs its energy beams directly onto the surface. An energy shielding or an energy reflector concentrates the energy to the limited space in which the liner is to be produced and protects the bulk of the drilling fluid outside said limited space from radiated energy.

The energy source of the treatment device can be of any type that allows directed radiation of energy onto the surface of the borehole. Preferably, the energy source is a laser device or an induction heating device or a microwave radiating device or a super-sonic energy radiating device. The type of the energy source will be chosen depending on the polymer material and/or in case of particulate material comprising a core, e.g. a metal core, in dependence of the material of the core, as it known in the art.

The liner is continuously produced on the wall of the borehole. The thickness can be controlled by controlling the concentration of the polymer material within the drilling fluid, the axial of the speed of the drill pipe string and the circulating velocity of the drilling fluid along the wall of the borehole. Depending on the porosity of the formation, the polymer material may migrate into the formation to seal and/or improve anchoring of the liner at the formation. Basically, it is sufficient to compact the polymer material contained in the drilling fluid starting from the average concentration of the polymer material in the drilling fluid, but preferably the treatment device is adapted to specifically raise the concentration of the polymer material in the vicinity of the wall and in particular in the vicinity of the limited space, in which the treatment device concentrates energy for fusing and/or curing the polymer material.

In a preferred embodiment, additional pressure is exerted onto particulate polymer material by magnetic forces produced by at least one magnet of the treatment device. The particulate polymer material comprises solid particles of a diamagnetic material, for example copper, which is repelled within the magnetic field produced by the treatment device onto the surface of the borehole. The magnetic repellent force pushes the particles towards and into the formation where the particles concentrate for forming the liner.

If the drilling fluid contains particulate polymer material comprising solid particles having a particle density higher than the density of the drilling fluid including particulate material other than the particulate polymer material, the concentration of the polymer material in the vicinity of the wall of the borehole can be raised by a centrifugal separator coaxially arranged with the drill pipe string. The centrifugal separator centrifugates the higher density particulate polymer material towards the wall of the borehole while the drilling fluid flows axially along the annulus. The centrifugal induces a whirl in the drilling fluid around the drill string a certain distance before and in the limited space curing position. Preferably, the solid particles of the particulate polymer material have a density which is higher than the density of formation particles contained in the drilling fluid and also higher than the density of the rest of the drilling fluid. Due to the centrifugal action the particles with the highest density, e.g. the particulate polymer material will be separated onto the wall of the borehole to produce the layer while lighter components of the drilling fluid will remain in a radially inner portion of the annulus.

In a preferred embodiment, the centrifugal separator is in the form of a helical vane coaxially stationary surrounding the drill pipe string. In another embodiment, the centrifugal separator can be in the form of a motor-driven impeller coaxially rotating with respect to the drill pipe string. The impeller has a fan wheel which produces the whirl in the drilling fluid to centrifugate the particles onto the wall of the borehole.

The idea of concentrating particulate polymer material at the wall of the borehole by means of centrifugating the drilling fluid in the annulus can also be carried out with a treatment device not being adapted to concentrate the energy in a limited space near the wall of the borehole. The aspect of the centrifugal separator thus can be used with an equipment the treatment device of which heats the drilling fluid within the total radial depth of the annulus.

The invention further is directed to a method for reinforcing a borehole of a well while drilling the borehole. The method comprises the steps of circulating a drilling fluid containing fusible and/or curable polymer material dissolved and/or emulsified and/or dispersed therein along the surface of the borehole and concentrating energy for fusing and/or curing the polymer material in a limited space in the vicinity of the surface of the borehole while drilling of the borehole is continued. The equipment explained above is intended to carry out the method.

BRIEF DESCRIPTION OF THE DRAWINGS

In the following, embodiments of the invention are explained in more detail with reference to the accompanying drawings in which.

DETAILED DESCRIPTION OF THE DRAWINGS

Figure 1:
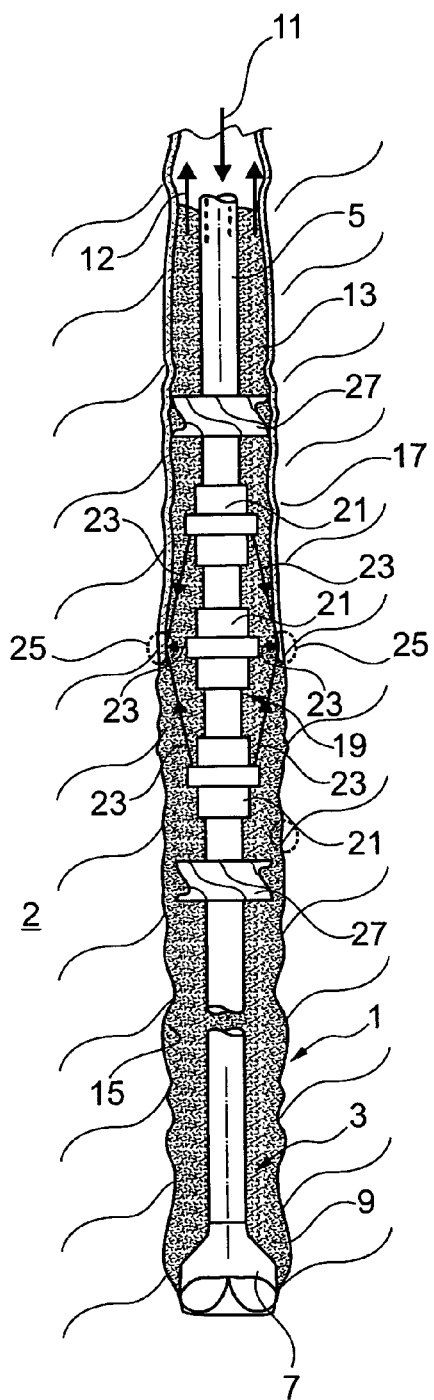
FIG. 1 is a schematic section through a borehole of a well with a first embodiment of an equipment for drilling and reinforcing the borehole.

FIG. 1 shows a section through the downhole end of a borehole 1 of a well intended to produce oil and/or natural gas from a formation 2. The borehole 1 is drilled by a drilling equipment 3 comprising a drill pipe string 5 having at its lowermost end a drill bit 7. The drill pipe string 5 can be constructed in form of a coiled tubing, and the drill bit 7 may include a roamer and a downhole drill motor. Drilling fluid 9 (mud) is circulated from the top of the borehole 1 down to the drill bit 7 through the drill pipe string 5 (arrow 11) and back to the top of the borehole 1 through an annulus 13 radially between the drill pipe string 5 and the surface 15 or wall of the borehole 1 (arrow 12). The drilling fluid lubricates the drill bit 7 and conveys chips the drill bit 7 has produced from the formation to the top of the borehole 1. As it is known in the art, the drilling fluid also provides for a counterbalance to formation fluid pressure to prevent uncontrolled flow of fluids from the formation 2 into the borehole 1 or vice versa.

To protect the wall 15 of the borehole 1 and to continuously and simultaneously apply a liner 17 to the wall 15 for reinforcing and sealing the surface of the formation, a treatment device 19 is attached to the drill pipe string 5 adjacent to the drill bit 7. The treatment device 19 fuses and/or cures polymer material which is contained in the drilling fluid 9 in a dissolved and/or emulsified and/or dispersed form and which circulates together with the drilling fluid 9 in the annulus 13 along the wall 15 of the borehole 1. Under the pressure of the drilling fluid 9 the polymer material enters to a certain degree into the pores of the formation 2 and anchors the liner 17 produced on the wall 15 to the formation 2.

The liner 17 is continuously produced on the wall 15 by the treatment device 19 as explained in more detail below. The thickness of the liner 17 is controlled by controlling the density of the polymer material within the drilling fluid 9, the axial speed of the drill pipe string 5 carrying the treatment device 19 and the circulating velocity of the drilling fluid 9 within the annulus 13.

The polymer material preferably is in a particulate form with a particle size of less than 1 mm, preferably less than 0.3 mm, for example 0.1 mm. The material should withstand well fluids and drilling fluids. It is essential that the polymer material is capable of fusing and/or curing above a threshold temperature either by melting above the threshold temperature or by being initiated to cure above the threshold temperature. The polymer material can be a one-component system or a two-component system. Of course, instead of a temperature threshold other polymer systems may be used relying on another initializing process, for example on the basis of UV-light energy supply.

The treatment device 19 comprises a plurality of laser devices 21, here three laser devices 21, which are staggered in axial direction of the drill pipe string 5 and each of which produces a plurality of laser beams 23 distributed around the drill pipe string 5. Groups of laser beams 23 with at least one laser beam 23 of each of the laser devices 21 are directed onto the wall 15 of the borehole such that the laser beams 23 of each group intersect in a limited space 25 in the vicinity of the wall 15 of the borehole 1. Thus, the groups of laser beams 23 are focused to said limited space and provide energy spots of a raised energy level within the limited space 25 as compared to the rest of the annulus 13 where the bulk of the polymer material circulates with the drilling fluid 9. Only in the limited space 25, the polymer material is fused and/or cured to form the liner 17 while the bulk of the polymer material will not be influenced.

The treatment device 19 and thus the laser beams 23 rotate together with the drill pipe string 5. In case of a non-rotating drill pipe string, the treatment device 19 is rotated by a downhole motor relatively to the drill pipe string 5. Axially on both sides of the treatment device 19 centralizers 27 are provided to guide the treatment device 19 concentrically with the borehole 1.

During drilling the borehole 1, the drilling fluid 9 continuously circulates through the drill pipe string 5 and the annulus 13 past the treatment device 19. The continuously rotating laser devices 21 are focused to a "hot spot" within the limited space 25 so as to heat the polymer material contained in the drilling fluid 9 above the threshold temperature of the polymer material and fuses and/or initiates curing of the polymer material in the vicinity of the wall 15 to continuously build up the liner 17 simultaneously with the feed motion of the drill bit 7.

In the following, other embodiments of the invention will be described. Components having a similar purpose or function as described with respect to FIG. 1 will be assigned the same reference numeral with a letter added for distinction. Reference is made to the above description of FIG. 1.

Figure 2:
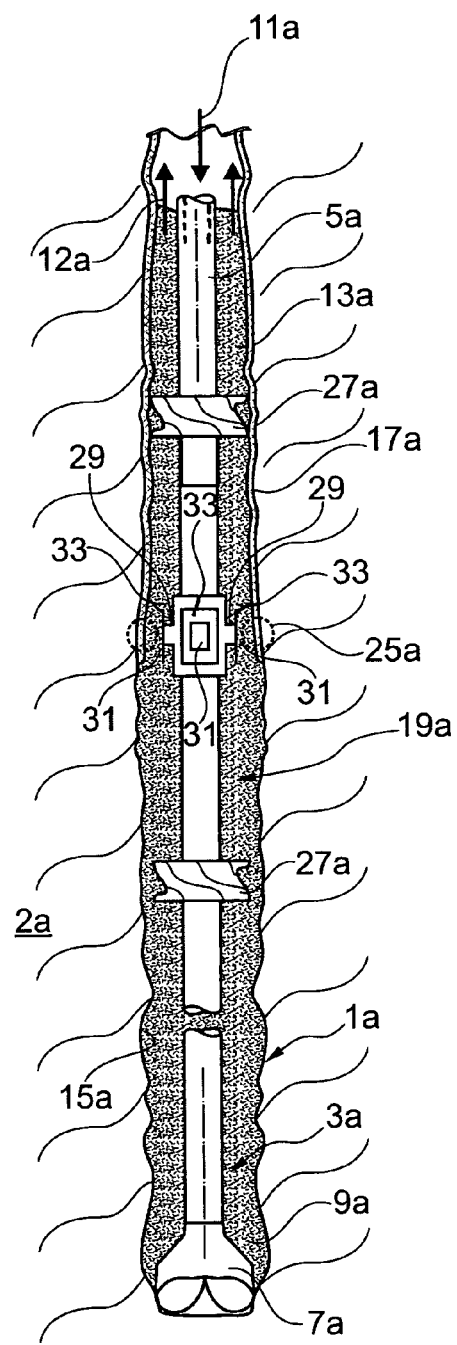
FIG. 2 is a section through the borehole of the well with another embodiment of the equipment for drilling and reinforcing the borehole.

FIG. 2 shows a drilling equipment 1a which differs from that of FIG. 1 by the treatment device 19a. Contrary to the plurality of laser devices 21 of FIG. 1, the treatment device 19a comprises a plurality of energy radiating devices 29 each having an energy output port 31 positioned in the vicinity of the wall 15a of the borehole 1a, and a shielding or reflector 33 which shields the bulk of polymer material outside the limited space 25a against the energy radiated into the limited space 25a in the vicinity of the wall 15a. Thus, only the polymer material present in the limited space 25a will be fused and/or cured to form the liner 17a. The shielding/reflector 33 is shown in the form of a plate; of course, other forms may be used, for example tubes which radially extend beyond the energy output port 31 towards the wall 15a.

Both in FIG. 1 and FIG. 2, a plurality of energy beams or energy devices are provided around the drill pipe string. As will be understood by those skilled in the art, only one group of energy beams or only one energy output port is sufficient.

Instead of laser devices as shown in FIG. 1, microwave devices or induction heating devices or ultrasound devices may be used. The same applies to the embodiment of FIG. 2.

Figure 3:
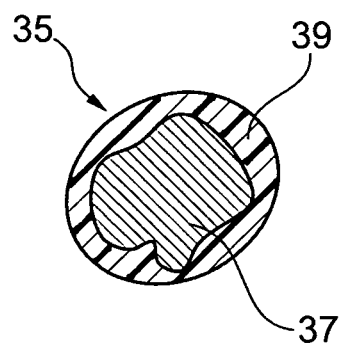
FIG. 3 is a cross-section of a particle contained in the drilling fluid used with the equipment while drilling.

The fusible and/or curable polymer material preferably is in a particulate form consisting of particles with a size of less than about 1 mm, preferably of less than 0.3 mm and more preferably of about 0.1 mm. The particles may consist completely of polymer material, but preferably have a structure as shown in FIG. 3 as a section through particle 35. The particle 35 has a core 37 of solid material like mineral material, e.g. sand or preferably a metal. The core 37 is entirely coated by a layer 39 of the polymer material. By fusing and/or curing the coating 39 during production of the liner, the particles 35 are combined to an integral layer by fusing or curing the coatings 39 together, while the core 37 provides for ductility and toughness, in particular when the cores 37 consist of steel.

Figure 4:
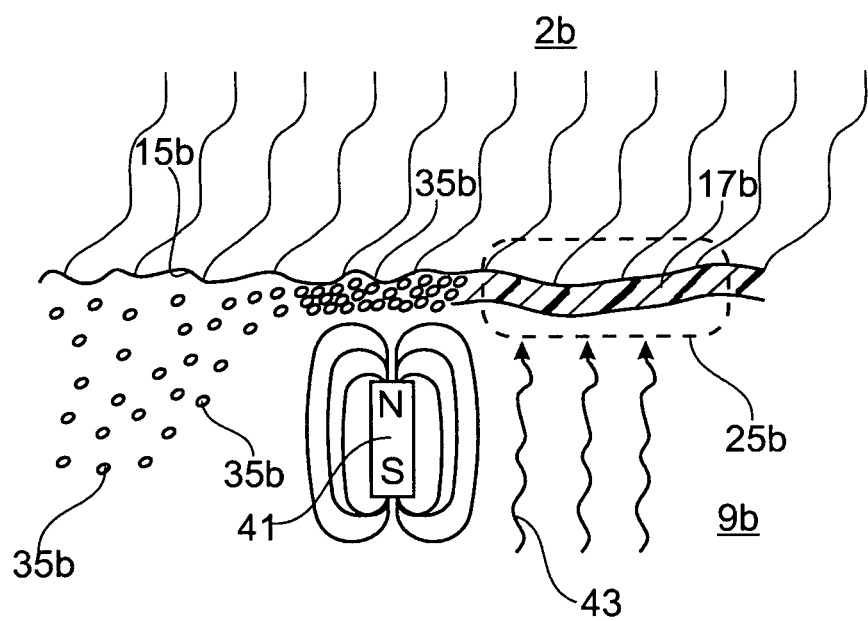
FIG. 4 is a sketch of an improvement of the equipment to be used with the equipment of FIG. 1 or 2.

FIG. 4 shows a sketch of an improvement which may be added to the embodiments of FIG. 1 or 2. The particles 35$b$, which have the structure as shown in FIG. 3 have a core consisting of a diamagnetic metal, for example copper, which, brought in a magnetic field, is repelled by a magnet. In order to produce repellent forces acting on such particles 35$b$, the treatment device 19 as explained in FIG. 1 or the treatment device 19$a$ of FIG. 2 comprises at least one magnet 41, the magnetic field of which is directed so as to force the diamagnetic particles 35$b$ towards the wall 15$b$ of the borehole. The magnet 41 is positioned downhole of the limited space 25$b$ at which energy indicated at 43 fuses and/or cures the polymer material of the particles 35$b$ to form the liner 17$b$. The magnet 41 concentrates the particles 35$b$ in the vicinity of the wall 15$b$ and exerts some radial pressure onto the particles 35$b$ before and while forming the liner 17$b$.

Figures 5, 6:
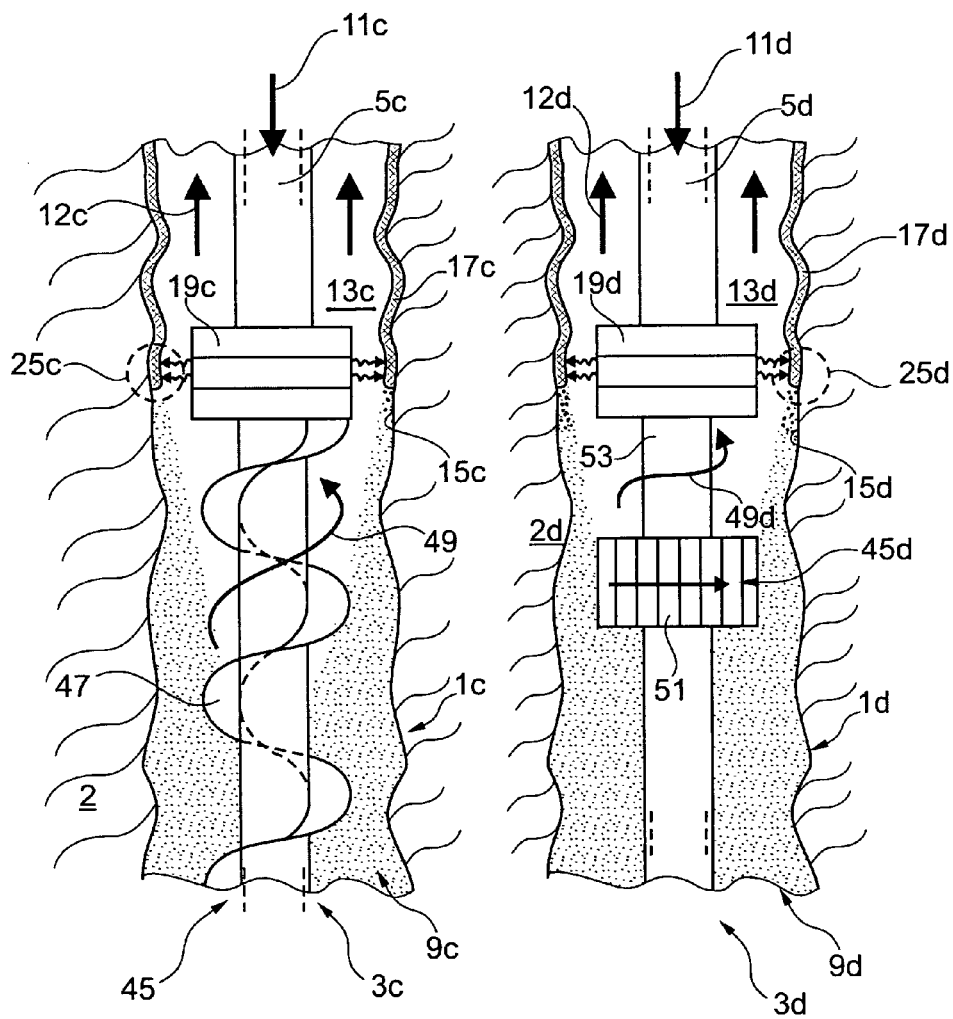
FIG. 5 and FIG. 6 are sketches of alternatives to the improvement of FIG. 4.

FIG. 5 shows an embodiment which allows raising the concentration of particulate polymer material in the vicinity of the wall 15$c$ of the borehole 1$c$. The particulate polymer material comprises solid particles as shown in FIG. 3 at 35 having a solid core in particular of a metal like steel with the core being coated with fusible and/or curable polymer material. The solid particles have an overall density which is higher than the density of any other particles, for example formation particles contained in the drilling fluid and also higher than the density of the rest of the drilling fluid. By engineering the solid particles of the particulate polymer material in this way, the particulate material can be concentrated at the wall 15$c$ of the borehole 1$c$ by producing a drilling fluid whirl within the annulus 13$c$ around the drill pipe string 5$c$ at a certain distance before and within the curing position defined by the treatment device 19$c$ within the limited space 25$c$.

As shown in FIG. 5, a centrifugal separator 45 is provided coaxially with the drill pipe string 5$c$ upstream in the flow direction 12$c$ of the drilling fluid 9$c$. The centrifugal separator 45 is in the form of a helical vane 47 coaxially fixed to the drill pipe string 5$c$ to impart a whirl movement (arrow 49) to the drilling fluid 9$c$ flowing uphole in the annulus 14$c$. As indicated in FIG. 5, the concentration of the particulate polymer material within the whirl fluid flowing uphole in the direction 12$c$ rises towards the fusing and/or curing position in the limited space 25$c$.

FIG. 6 shows a variant of the centrifugal separator 45$d$ in the form of a fan wheel 51 which is arranged coaxial to the drill pipe string 5$d$. A motor 53 rotates the fan wheel 51 to produce a centrifugating whirl of drilling fluid within the annulus 13$d$. Again the particulate polymer material contained in the drilling fluid is concentrated some distance before and within the curing position at the limited space 25$d$.

The treatment device 19$c$ or 19$d$, respectively, makes use of the energy concentrating idea the embodiments of FIGS. 1 and 2 are based on. Since the centrifugal separators 45, 45$d$ of the embodiments shown in FIGS. 5 and 6 provide for a concentration of the polymer material in the vicinity of the wall of the borehole, it is preferred but not necessary that the energy produced by the treatment devices is radially confined or concentrated at the vicinity of the wall. The limited space may be extended radially up to the drill pipe string since the centrifugal action lowers the concentration of particulate polymer material in the vicinity of the drill pipe string. The same applies to the embodiment shown in FIG. 4.

The invention claimed is:

1. Equipment for drilling and reinforcing a borehole of a well comprising:
   a drill pipe string comprising a drill tool at a lowermost end of the drill pipe string;
   a drilling fluid circulation means for circulating drilling fluid through the drill pipe string and the drill tool to an annulus between the drill pipe string and the borehole;
   a downhole treatment device held on the drill pipe string for applying a liner of polymer material at a surface of the borehole,
   wherein,
   the drilling fluid circulated through the annulus is a fluid system containing fusible and/or curable polymer material dissolved and/or emulsified and/or dispersed therein and the treatment device is adapted to concentrate energy for fusing and/or curing the polymer material contained in the drilling fluid in a limited space in the vicinity of the surface of the borehole.

2. Equipment according to claim 1, wherein the treatment device is an energy radiating device producing at least two energy beams which intersect in the limited space in the vicinity of the surface of the borehole.

3. Equipment according to claim 2, wherein the energy radiating device comprises at least two laser light devices or microwave devices or induction heating devices or ultrasound devices providing intersecting energy beams.

4. Equipment according to claim 1, wherein the treatment device has at least one energy output port positioned in the vicinity of the surface of the borehole.

5. Equipment according to claim 4, wherein the energy output port has associated thereto an energy shielding and/or an energy reflector to focus the energy to the surface of the borehole.

6. Equipment according to claim 1, wherein the drilling fluid contains a particulate polymer material.

7. Equipment according to claim 6, wherein the particulate polymer material comprises solid particles coated with fusible and/or curable polymer material.

8. Equipment according to claim 7, wherein the solid particles are comprised of metal.

9. Equipment according to claim 1, wherein the drilling fluid contains particulate polymer material comprising solid particles of a diamagnetic metal coated with fusible and/or curable polymer material, and wherein the treatment device comprises magnetic accelerating means for radially accelerating the particulate polymer material towards the surface of the borehole.

10. Equipment according to claim 1, wherein the drilling fluid contains particulate polymer material comprising solid particles having a particle density higher than the density of the drilling fluid including particulate material other than the particulate polymer material and wherein the downhole treatment device comprises a centrifugal separator coaxial with the drill pipe string adapted to centrifugate the higher density particulate polymer material of the drilling fluid circulating in the annulus radially outwards towards the surface of the borehole.

11. Equipment according to claim 10, wherein the centrifugal separator comprises coaxial to the drill pipe string a stationary helical vane or a motor-driven fan wheel.

12. A method for reinforcing a borehole of a well while drilling the borehole comprising the steps of:
   circulating a drilling fluid containing fusible and/or curable polymer material dissolved and/or emulsified and/or dispersed therein through a drill pipe string and a drill tool to an annulus between the drill pipe string and the borehole and along the surface of the borehole and
   concentrating energy for fusing and/or curing the polymer material in a limited space in the vicinity of the surface of the borehole while drilling of the borehole is continued.

13. The method according to claim 12, wherein the step of concentrating energy for fusing and/or curing the polymer material in the vicinity of the surface of the borehole comprises the step of simultaneously directing at least two energy beams to the limited space such that the energy beams intersect within the limited space.

14. The method according to claim 12, wherein the step of concentrating energy for fusing and/or curing the polymer material in the vicinity of the surface of the borehole comprises the step of outputting the energy in the vicinity of the limited space while shielding and/or reflecting the energy at the side of the limited space remote of the surface of the borehole.

15. The method according to claim 12, wherein the drilling fluid contains particulate polymer material comprising solid particles, in particular solid metal particles coated with fusible and/or cur- able polymer material.

16. The method according to claim 15, wherein the solid metal particles consist of a diamagnetic metal and the method further comprises the step of magnetically accelerating the particles towards the surface of the borehole.

17. The method according to claim 15, wherein the step of circulating the drilling fluid comprises producing upstream of the limited space of concentrated energy a whirl of drilling fluid coaxial with the borehole for centrifugating particulate polymer material towards the surface of the borehole.

18. The method according to claim 15, wherein the particles have an outer diameter of less than 1 mm.

19. The method according to claim 18, wherein the particles have an outer diameter of less than 0.3 mm.

* * * * *